United States Patent
Chang et al.

(10) Patent No.: US 9,648,713 B2
(45) Date of Patent: May 9, 2017

(54) HIGH-GAIN THOMPSON-SCATTERING X-RAY FREE-ELECTRON LASER BY TIME-SYNCHRONIC LATERALLY TILTED OPTICAL WAVE

(71) Applicants: The Board of Trustees of the Leland Stanford Junior University, Palo Alto, CA (US); Tsinghua University, Beijing (CN)

(72) Inventors: Chao Chang, Beijing (CN); Chuanxiang Tang, Beijing (CN); Juhao Wu, Palo Alto, CA (US)

(73) Assignees: The Board of Trustees of the Leland Stanford Junior University, Palo Alto, CA (US); Tsinghua University, Beijing (CN)

( * ) Notice: Subject to any disclaimer, the term of this patent is extended or adjusted under 35 U.S.C. 154(b) by 67 days.

(21) Appl. No.: 14/775,838

(22) PCT Filed: Mar. 14, 2014

(86) PCT No.: PCT/US2014/027729
§ 371 (c)(1),
(2) Date: Sep. 14, 2015

(87) PCT Pub. No.: WO2014/152784
PCT Pub. Date: Sep. 25, 2014

(65) Prior Publication Data
US 2016/0044771 A1    Feb. 11, 2016

Related U.S. Application Data

(60) Provisional application No. 61/792,281, filed on Mar. 15, 2013.

(51) Int. Cl.
*H05G 2/00* (2006.01)
*H01S 4/00* (2006.01)
(Continued)

(52) U.S. Cl.
CPC .............. *H05G 2/00* (2013.01); *H01S 3/005* (2013.01); *H01S 3/0903* (2013.01); *H01S 4/00* (2013.01); *H01S 3/30* (2013.01); *H05H 2007/041* (2013.01)

(58) Field of Classification Search
CPC .. H05G 2/00; H05G 2/008; H01S 3/09; H01S 3/0903; H01S 4/00
See application file for complete search history.

(56) References Cited

U.S. PATENT DOCUMENTS 5,016,250 A * 5/1991 Rosen ...................... H01S 4/00
    372/102
5,247,562 A * 9/1993 Steinbach ................ H05G 2/00
    372/22

(Continued)

OTHER PUBLICATIONS

Lau et al. (2003) Nonlinear Thomson scattering: A tutorial. Phys. Plasmas, vol. 10, No. 5, May 2003, 2155-2162.

*Primary Examiner* — Thomas R Artman
(74) *Attorney, Agent, or Firm* — Lument Patent Firm

(57) ABSTRACT

An improved optical undulator for use in connection with free electron radiation sources is provided. A tilt is introduced between phase fronts of an optical pulse and the pulse front. Two such pulses in a counter-propagating geometry overlap to create a standing wave pattern. A line focus is used to increase the intensity of this standing wave pattern. An electron beam is aligned with the line focus. The relative angle between pulse front and phase fronts is adjusted such that there is a velocity match between the electron beam and the overlapping optical pulses along the line focus. This allows one to provide a long interaction length using short and intense optical pulses, thereby greatly increasing the radiation output from the electron beam as it passes through this optical undulator.

9 Claims, 8 Drawing Sheets

(51) Int. Cl.
  *H01S 3/09* (2006.01)
  *H01S 3/00* (2006.01)
  H01S 3/30 (2006.01)
  H05H 7/04 (2006.01)

(56) References Cited

U.S. PATENT DOCUMENTS

| | | | | |
|---|---|---|---|---|
| 5,353,291 A * | 10/1994 | Sprangle | ............... | H01S 4/00 |
| | | | | 372/10 |
| 7,382,861 B2 * | 6/2008 | Madey | ............... | H05G 2/00 |
| | | | | 378/119 |
| 8,976,834 B2 * | 3/2015 | Kaster | ............... | H01S 3/0057 |
| | | | | 372/92 |
| 9,268,151 B2 * | 2/2016 | Debus | ............... | H01S 3/0057 |
| 2007/0014392 A1 | 1/2007 | Madey | | |
| 2007/0152171 A1 | 7/2007 | Goldstein | | |
| 2008/0219297 A1 | 9/2008 | Yamada | | |
| 2012/0106577 A1 * | 5/2012 | Balcou | ............... | H01S 3/0903 |
| | | | | 372/2 |
| 2013/0148203 A1 | 6/2013 | Debus | | |
| 2013/0215925 A1 * | 8/2013 | Kaster | ............... | H01S 3/0057 |
| | | | | 372/98 |
| 2016/0044771 A1 * | 2/2016 | Chang | ............... | H05G 2/00 |
| | | | | 250/494.1 |

* cited by examiner

HIGH-GAIN THOMPSON-SCATTERING X-RAY FREE-ELECTRON LASER BY TIME-SYNCHRONIC LATERALLY TILTED OPTICAL WAVE

CROSS REFERENCE TO RELATED APPLICATIONS

This application is 371 of PCT application PCT/US2014/027729 filed on Mar. 14, 2014. PCT application PCT/US2014/027729 filed on Mar. 14, 2014 claims the benefit of U.S. Provisional application 61/792,281 filed on Mar. 15, 2013.

STATEMENT OF GOVERNMENT SPONSORED SUPPORT

This invention was made with Government support under contract DE-AC02-76SF00515 awarded by the Department of Energy. The Government has certain rights in the invention.

FIELD OF THE INVENTION

This invention relates to X-ray sources.

BACKGROUND

Free electron lasers (FELs) are useful for various applications, since they can provide intense radiation in various parts of the electromagnetic spectrum, such as X-rays. In a free electron laser, radiation is emitted by the interaction of an electron beam with an undulator. However, conventional free electron lasers tend to be large and complex systems, mainly driven by the complexities of the large-scale magnetic undulator typically employed.

Proposals have been made to provide an undulator suitable for use in a free electron laser using optical techniques. However, these approaches have not yet provided competitive performance relative to traditional FEL approaches.

Accordingly, it would be an advance in the art to provide improved X-ray sources via the interaction of an electron beam with an optical undulator.

SUMMARY

In this work, an improved optical undulator for use in connection with free electron radiation sources is provided. A tilt is introduced between phase fronts of an optical pulse and the pulse front. Two such pulses in a counter-propagating geometry overlap to create a standing wave pattern. A line focus is used to increase the intensity of this standing wave pattern. An electron beam is aligned with the line focus. The relative angle between pulse front and phase fronts is adjusted such that there is a velocity match between the electron beam and the overlapping optical pulses along the line focus. This allows one to provide a long interaction length using short and intense optical pulses, thereby greatly increasing the radiation output from the electron beam as it passes through this optical undulator.

DETAILED DESCRIPTION

A) Introduction

Figure 1A:
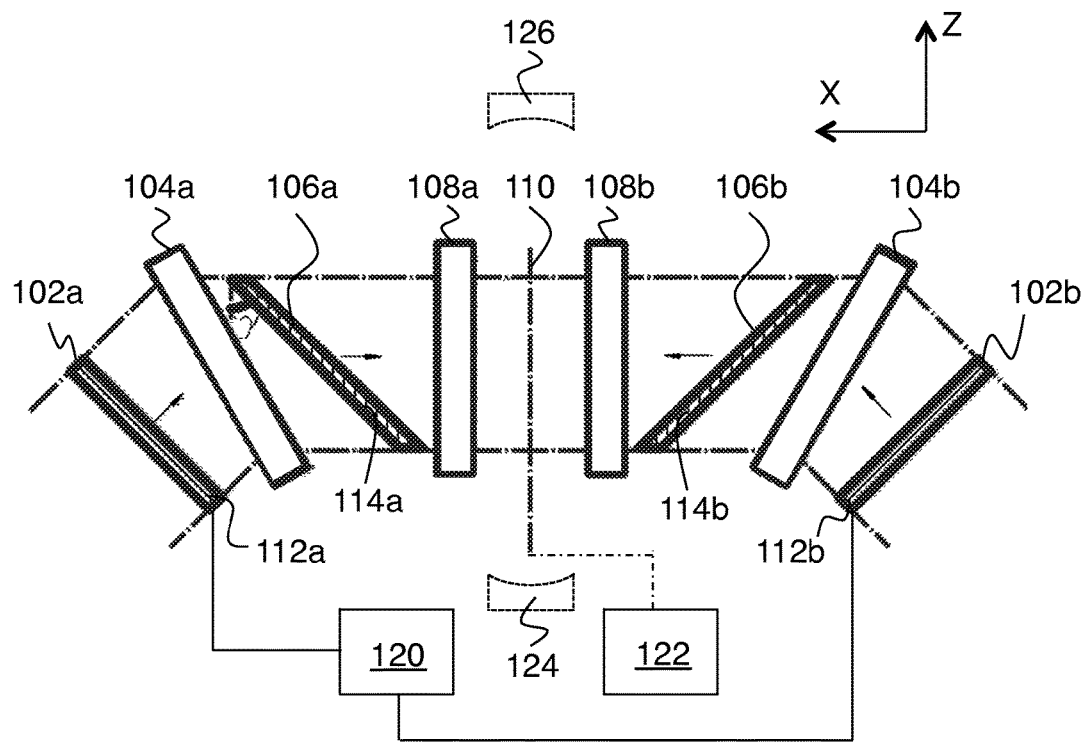
FIGS. 1A-B show two views of an embodiment of the invention.

Free-electron lasers (FEL) are the most powerful X-ray radiation sources to support much frontier research; however, because of the large-scale magnetic undulator and RF (radio frequency) electron accelerator limit, only a few sources exist worldwide. The optical undulator and laser-plasma accelerators, on the other hand, may provide the potential to significantly reduce the size and cost of these X-ray sources to the university-laboratory scale.

For a nonlinear relativistic Thompson scattering, the magnetic and electric fields of the light have the same effect on the electron motion, and electrons emit X-ray photons through the relativistic motion. The optical wave in the nonlinear Thompson scattering serves as an electromagnetic undulator, whose periods are several orders of magnitude shorter than the conventional undulator that uses an alternating static magnetic field for synchrotron radiation or FEL. There are various applications of such Thompson or Compton X-ray sources including measurement of the plasma parameters in the Z pinch and energy and energy spread of electron beams, imaging of atomic-scale spatial resolution, and biological and medical diagnostic systems.

The conventional method for Thompson scattering using counter propagating lasers with electron beams has confronted a bottleneck: the highest yield of X-ray flux was reported at about $2 \times 10^7$ photons with several picoseconds duration. The reason is that the interaction time for the close-to-speed-of-light electron beam and the counter propagating laser mainly depends on the laser pulse duration. Thus, a long laser pulse is naturally demanded. For instance, in order to realize FEL in an optical undulator with a 10-20 gain length, i.e., about 3 cm long, an ultra-long 200 ps and ultra-intense Terawatt counter propagating laser pulse is needed, which is hard to realize. For a laser co-propagating with a beam, the electric force and magnetic force on the relativistic electron cancel each other, leading to a very low net field strength. Consequently, only incoherent or weak coherent radiation is emitted. In order to decrease the gain length and enhance the X-ray yield, increasing the beam current or decreasing the electron energy has been proposed. For instance, electron beams with peak current 20 kA, low energy 30 MeV, emittance 0.3 πmm mrad, and relative energy spread 0.4% were proposed; however, there is still no experimental demonstration on generating such an ultrahigh current and low energy beam. In other work, an electron beam of low energy 5.88 MeV, current 0.5 kA, and relative energy spread of 0.01% is needed to interact with a Terawatt laser of 1 μm transverse spot size and 20 ps pulse duration to generate a 0.3 MW X-ray. Consequently, how to realize $10^8$ photons with femtoseconds duration in a single laser pulse is still a critical problem. In this work, novel methods to significantly increase the coherent X-ray output by several orders with several femtoseconds duration are provided, which may finally realize a tabletop X-ray FEL.

B) Technical Approaches

Figure 1B:
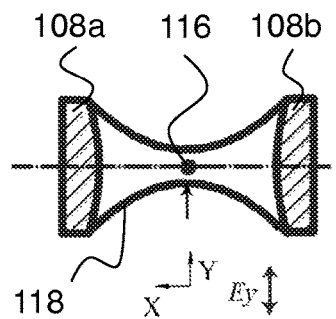

FIGS. 1A-B show a first exemplary embodiment of the invention. FIG. 1B is a close up side view of the interaction region of FIG. 1A. This example is an apparatus for producing X-rays. It includes at least one source 120 of optical radiation configured to emit pulses of optical radiation. Two such pulses are referenced as 102a and 102b. As emitted from the source, these pulses have parallel phase fronts (112a, 112b) and pulse fronts (edges of 102a, 102b). Source 120 can be configured as a single source plus an optical splitter, or as two sources appropriately phase and frequency locked to each other such that their outputs can interfere. Focusing optics are configured to bring two counter-propagating pulses of the optical radiation to a common line focus. Here pulses are regarded as counter-propagating if their wave vectors make an angle between about 170 degrees and about 190 degrees with respect to each other. In this example, cylindrical lenses 108a and 108b are employed to create a line focus along electron beam path 110. In this layout 108a and 108b could also be cylindrical mirrors, with appropriate modification to beam paths such that the desired line focus is formed.

An electron source 122 is configured to provide an electron beam 116 aligned with the line focus. This line focus is schematically shown by 118 on FIG. 1B. In this example, the electron beam is along beam path 110 (i.e., the Z direction). Electron beam 116 is preferably configured as separated bunches of electrons having as high a repetition rate as possible.

The focusing optics include one or more dispersive optical elements configured to introduce a tilt angle between phase fronts of the counter-propagating pulses and pulse fronts of the counter-propagating pulses. In this example, the dispersive optical elements are gratings 104a and 104b, and pulses 106a and 106b show the tilt between phase fronts 114a and 114b, (which are parallel to the Z-axis) and the pulse fronts (i.e., the edges of pulses 106a, 106b, which make a 45 degree angle with respect to the Z-axis). As described in greater detail below, this tilt angle is selected to substantially match a velocity of pulse front propagation along the line focus with an electron velocity of the electron beam along the line focus. Gratings 104a and 104b preferably have uniform line spacing.

The standing wave pattern formed by the counter-propagating pulses at the line focus acts as an undulator for emission of X-rays by electrons in the electron beam. Optionally, X-ray mirrors 124 and 126 can be disposed to create an X-ray resonator configured to provide feedback for the emitted X-rays, which provides a free electron laser. In this situation, one would also need to introduce bending magnets (not shown) to bring the electron beam into the X-ray resonator. Further technical details relating to this example follow.

In out first method, after being focused by cylindrical lenses, two counter-propagating laser pulses 106a, 106b with equal amplitude, the same vertical electric polarization $E_y$, and identical phase are at normal incidence to the electron-beam path 110, as illustrated in FIG. 1A. A standing wave along the optical propagation of the x direction is formed, which has a total y-polarized (pointing outward from the page) electric field with the expression of $2E_{y,m}(x,z) \times \cos(\omega t + \phi)\cos(kx)$ where $\omega$, $k$, $E_{y,m}(x,z)$ and $\phi$ are, respectively, the angular frequency, the wave number, the amplitude, and the injection phase of the laser, and the z-polarized magnetic field is parallel to the beam motion. The field amplitude of the standing wave at the central plane is strengthened because of the focus effect of the cylindrical lenses 108a, 108b. Thus, at the central plane x=0 of the beam channel, electrons undergo an intense transverse electric force $2eE_{y,m}(0,z)\cos(\omega t+\phi)$ and a negligible magnetic force. In this configuration, the undulator period is $\lambda_u=\lambda$, as compared to $\lambda_u=\lambda/2$ for a backward wave.

The time-synchronic interaction of the beam and waves is realized by the pulse front tilt, which is created by using an optical diffractive grating element 104a, 104b with angular dispersion, as illustrated in FIG. 1A, where γ is the tilt angle between the pulse front and the phase front. The pulses 106a, 106b still have their phase front 114a, 114b perpendicular to the propagation direction, but the arrival time of the laser pulse at the interaction area is synchronously delayed with the electron beam propagation.

Figure 2A:
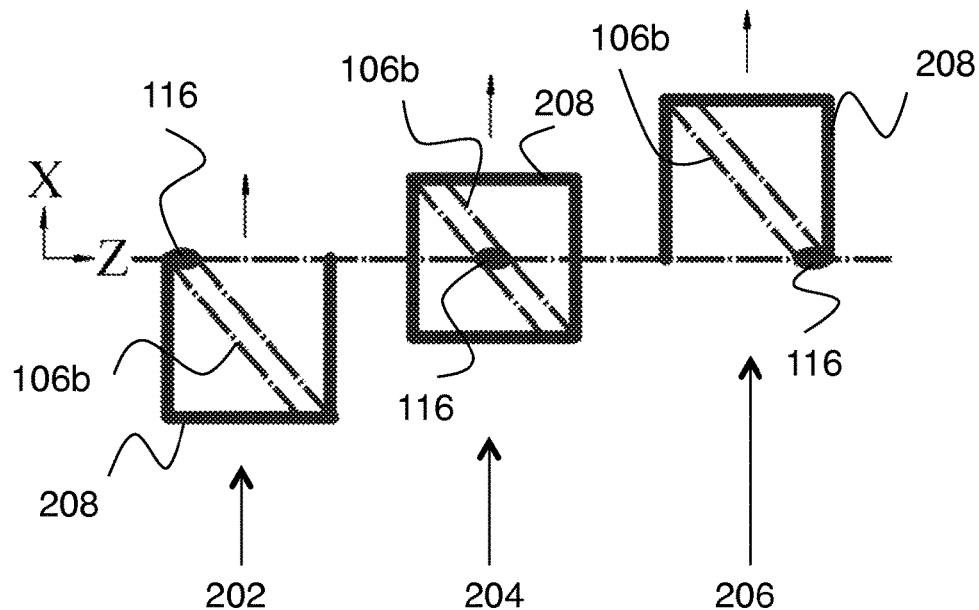
FIG. 2A shows overlap of an electron beam and a pulse having a tilt between the pulse front and the phase front.

It is illustrated in FIG. 2A that the electron beam 116 moves along the z axis, while the normal-incident laser propagates in the x direction. Configurations referenced as 202, 204, and 206 show three snapshots of beam-pulse interaction in order of increasing time. Electron beam 116 propagates in the Z direction (i.e., to the right on FIG. 2). Pulse 106b propagates in the X direction (i.e., up on FIG. 2). Overlap of the laser pulse and the electron beam is ensured by proper velocity matching, as shown. It is apparent that the beam always moves inside a diagonal area (actual pulse shape 106b) of a rectangular pulse shape 208. Consequently, the short tilted pulse 106b is equivalent to a full rectangular pulse 208 as seen by electron beam 116. Therefore, the interaction length can extend to the entire transverse width of the laser pulse, which can be on the order of several centimeters. This is long enough to realize the FEL exponential growth process, leading to a significantly enhanced coherent radiation.

It should be emphasized that the synchronization between the laser and beam is realized by using pulse front tilt, whose technology has been used in precise synchronization of fast electron diffraction. In our methods, the two lateral lasers could come from the split of a single laser after a single grating structure to avoid the timing jitter between lasers. Moreover, sub-100 as timing jitters between multiple optical pulse trains have been stably generated from mode-locked lasers. The synchronization between the remote optical pulse trains and microwave signal has achieved the rms timing jitter within 1 fs, beneficial for synchronization between laser and beam. Moreover, if the laser power is sufficiently high, a single laser as a lateral traveling wave could avoid the time jitter and realize a more uniform K distribution, while the basic scheme of the synchronous interaction of beam and laser stays the same in the standing wave case.

The necessary pulse front tilt γ is determined by the incidence angle α between the laser and highly relativistic beam: $\gamma=\pi/2-\arctan[\cot(\alpha/2)]$. For a normal incidence $\alpha=\pi/2$, tilt angle is $\gamma=\pi/4$, which can be created by an angular dispersion $d\epsilon/d\lambda$ from a diffractive grating satisfying $\gamma=\arctan[\lambda_0(d\epsilon/d\lambda)]$. The angular dispersion $d\epsilon/d\lambda$ is calculated from the groove spacing d and the incidence angle θ between the laser and the grating, $\epsilon(\lambda)=\arcsin[\lambda/d-\sin(\theta)]$. For $\lambda_0=10$ μm and $\theta=45°$, a grating of 97 grooves per millimeter is demanded.

The dimensionless strength parameter $K=eB_{eff}\lambda_u/(2\pi mc)$, where the equivalent magnetic field $B_{eff}=2E_{y,m}/c$, or we can write $K=2eE_{y,m}\lambda/(2\pi mc^2)$ for the undulator period $\lambda_u=\lambda$. The peak field at the grating elements is limited by its breakdown thresholds, which is about 2 J/cm² for an ultra-short laser pulse with τ<1 ps for the commercial high power gratings. The cylindrical lenses located between the grating structure and interaction area further enhance the peak field by focusing the transverse size, while keeping the synchronously delayed time of the laser with the electrons. Thus, K reaches 1 to 2 for laser with wavelength 10 μm at the vacuum interaction area.

Figure 2B:
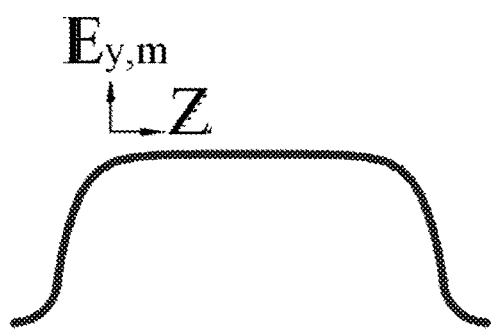
FIG. 2B shows a preferred temporal pulse shape.

The influence of laser intensity on the resonant wavelength is important. Using aspheric lens pairs (not shown on FIGS. 1A-B), the transverse intensity profile of the laser can be transformed from a Gaussian beam to a flattop beam, whose field $E_{y,m}$ is illustrated in FIG. 2B, and the rms flatness of power intensity for the flattop has been improved to 0.23%. Because of the relation $\Delta P/P = 2\Delta E/E$, the rms (root-mean square) flatness of electric field has reached 0.12%. We find the requirement on the tolerance of laser intensity temporal uniformity. Due to the fact that the laser temporal electric field is the effective optical undulator strength, the uniformity, one of the important requirements, directly determines the gain of a free-electron laser system. For radiation frequency up to the soft X-ray regime, the rms variation of the laser temporal electric field is preferably less than 0.5% to provide a useful amount of gain, and is more preferably less than 0.15% to provide high gain. These rms time variations are calculated by averaging at times when the pulse is present and excluding times when the pulse is not present.

Another method for enhancing the central electromagnetic field is to design a microstructure, including a central electron-beam vacuum channel and periodic-quadrupole dielectric waveguides, which have periodically varying index of refraction (silicon and vacuum) along the channel. Full-wave 3D electromagnetic simulation HFSS software is used to study the microstructure. The resulting structure is similar to that of FIGS. 1A-B, except that lenses 108a, 108b are replaced with a microstructure 302 as shown on FIG. 3. Crystalline silicon with a high index of refraction is selected as the material of the dielectric waveguides 306; $SiO_2$ or sapphire with lower refractive index is applied as the substrates 304. Here $W_c$ is the vacuum channel width, and the height and width of the silicon waveguides is $H_s$ and $W_s$ respectively. Such a microstructure is configured to provide optical resonance of the counter-propagating pulses at the line focus.

Figure 3:
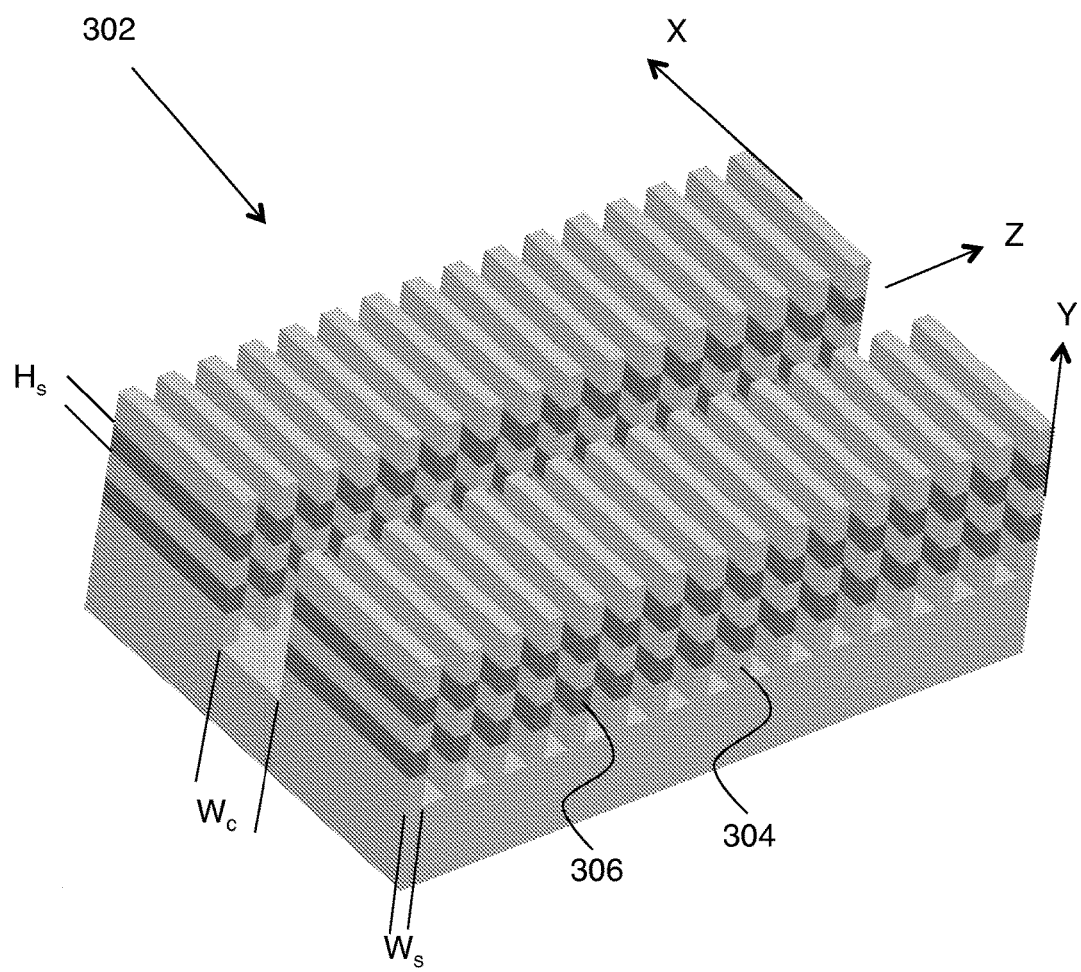
FIG. 3 shows a microstructure suitable for forming a line focus
Figure 4:
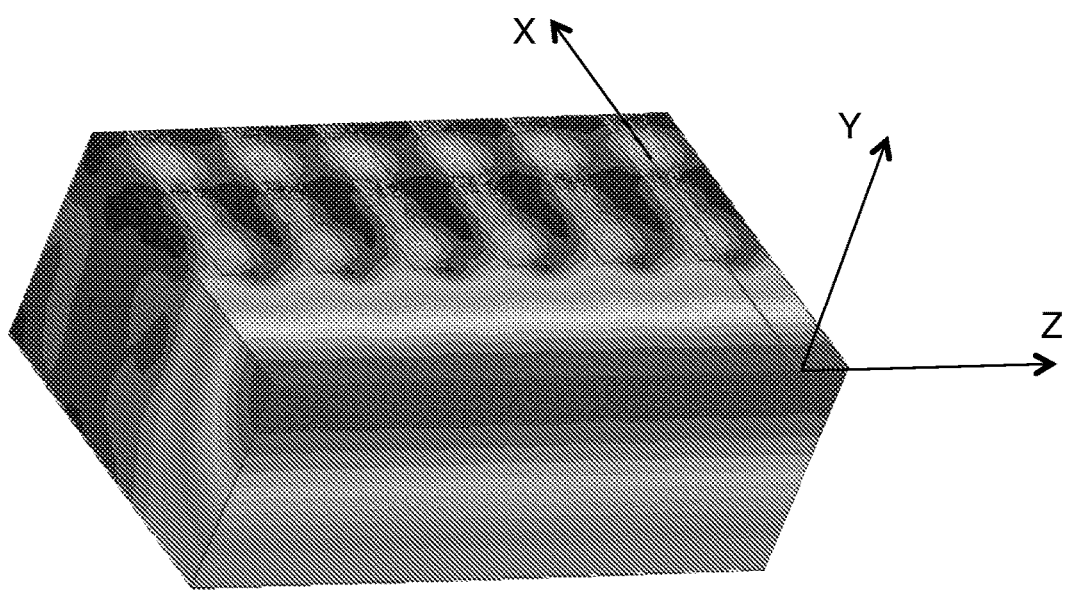
FIG. 4 shows a calculated field distribution for the example of FIG. 3.

Two optical plane waves at normal incidence to the beam channel with the equal amplitude, same polarization, and identical phase are oppositely and laterally coupled into the optical structure of FIG. 3. The polarized electric fields $E_y$ are perpendicular to the central z axis of the channel. When the two incident waves arrive at the central vertical yz plane, the electric fields with the same polarization and identical phase form a resonant standing wave, leading to a significantly enhanced amplitude, and the central yz plane is equivalent to a magnetic boundary by symmetry. In order to further strengthen the central field, a quasiquadrupole structure shown in FIG. 3 is designed, where the bilateral lasers are guided and propagated in the bilateral upper and lower waveguides, which are separated by a substrate layer. The incident phases in the ipsilateral upper and lower waveguides are the same so that the y-directional polarized electric field adds, and there is the strongest field at the center of the quadrupole aperture, as illustrated in FIG. 4 (which shows the modeled complex magnitude field in a quarter of the quadrupole structure 302). By symmetry, the horizontal xz plane is equivalent to an electric boundary.

By adjusting the periodic incident phases of the optical waves, a nonzero phase difference $\Delta\phi$ between the adjacent waveguides along the z direction is generated, which results in a traveling wave along the central channel, and a −11 dB reflection loss of incident wave. When the flying direction of the electron beam is opposite to the energy flow, relativistic electrons meet a backward wave, and undergo the sum of electric and magnetic forces.

Figure 5A:
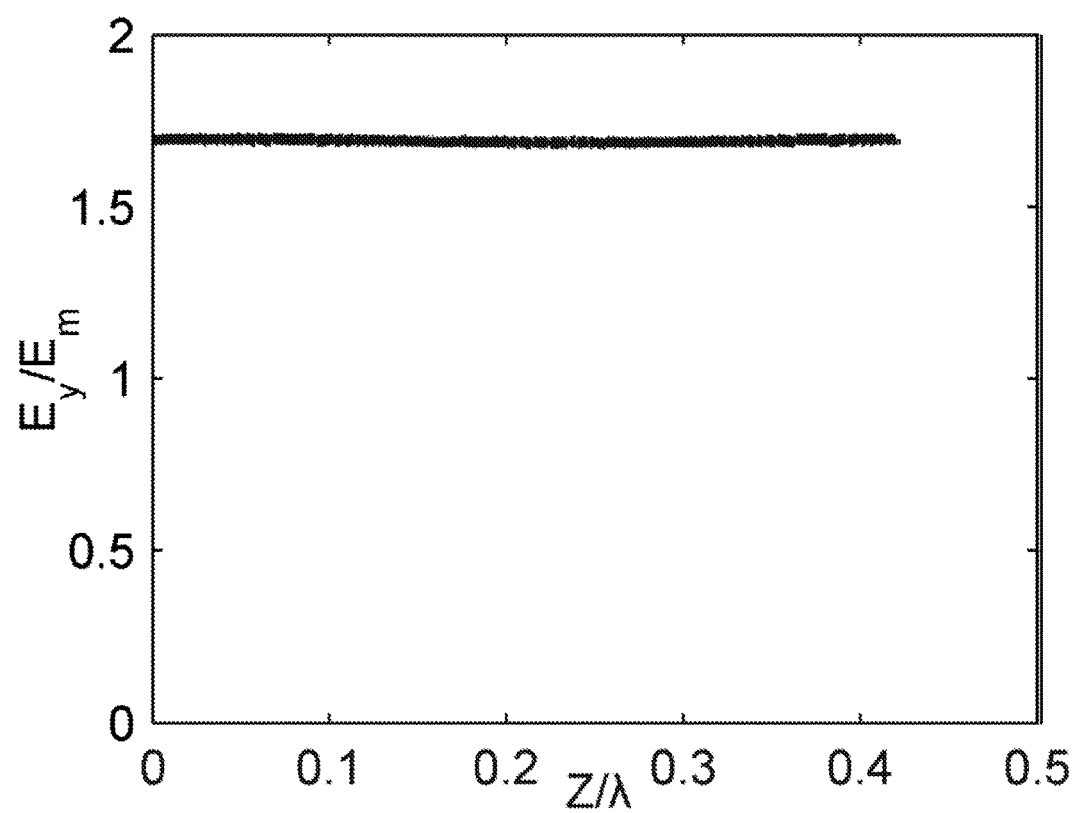
FIGS. 5A-B show further calculated field distributions for the example of FIG. 3.
Figure 5B:
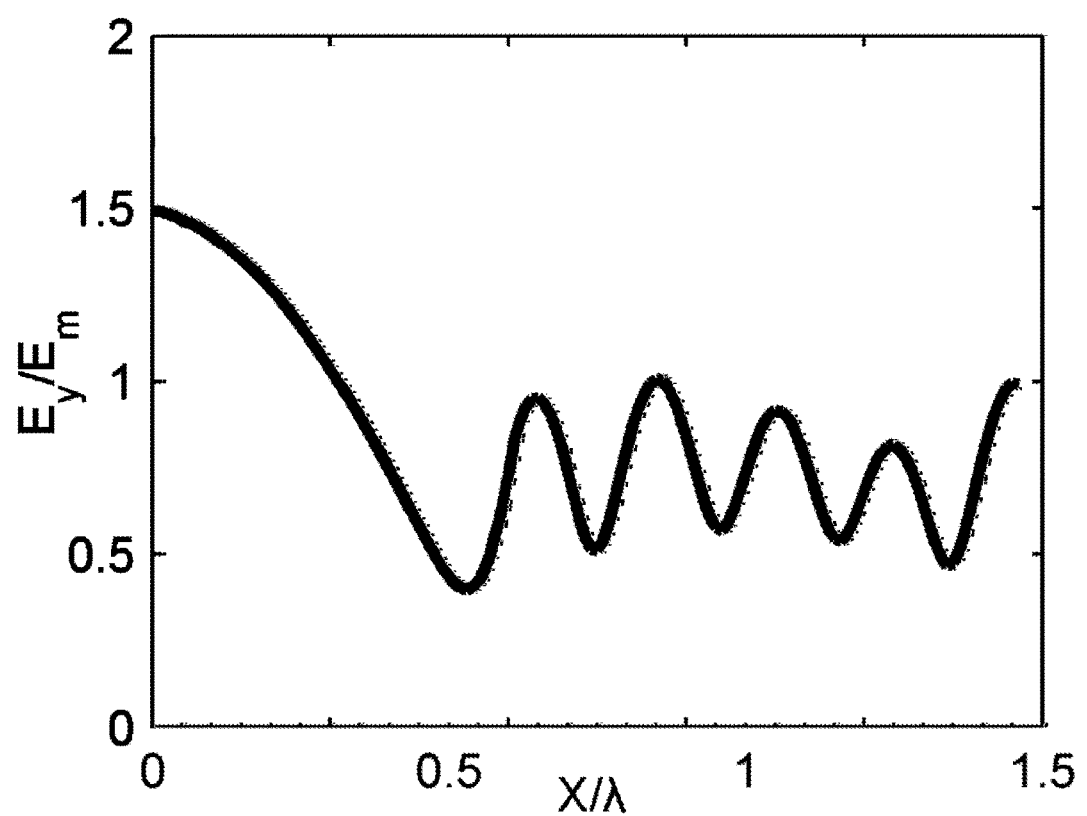

FIGS. 5A-B show the normalized complex magnitude of the electric field $E_y/E_m$ along the center line of the Si waveguide in the x direction (FIG. 5B) and along the central line of the quadrupole channel in the z direction (FIG. 5A). Parameters for these results were $W_c=1.3\lambda$, $H_s=0.3\lambda$, $W_s=0.19\lambda$, $L_0=0.42\lambda$, and $\Delta\phi=0.72\pi$. Here $E_m$ is the maximum field in the waveguide.

For a channel width $W_c \sim 1.3\lambda$, the optimized center field distribution is shown on FIG. 5A, which implies that the field is distinctly strengthened with the ratio $E_{y,m}/E_m \sim 1.7$, corresponding to a total force $(E_{y,m}+cB_{x,m}) \sim 3.4\ E_m$. In work by others, an optical Bragg waveguide with an inner diameter $0.2\lambda$ and a corresponding $E_{y,m}/E_m < 0.5$ was proposed to enhance the X-ray brightness by two orders since the laser is guided and focused inside the channel. As a comparison, the channel width $1.3\lambda$ and $E_{y,m}/E_m \sim 1.7$ for our structure are much better than those in the Bragg waveguide. With regard to fabrication, a 3D microstructure with a 3 cm length and detailed size ~1 μm was demonstrated by others in 1996, so fabrication of such microstructures is within the skill of ordinary workers in micro-fabrication.

The rms opening angle σ of the forward cone of X-ray radiation for undulator periods N=5000, rms K=1, and γ=100 is σ=1.5×10⁻⁴ rad, the transverse width of the radiation cone σL~4.5 μm for L=3 cm, smaller than the half-channel width. Thus, the dielectric channel walls do not influence the main X-ray radiation.

The electron beam quality has an important influence on FEL performance. Laser-driven plasma accelerators could deliver high-quality electron beams. In recent work by others, the high-brilliant beam was generated with peak current 10 kA, normalized emittance of $\in_n=0.3$-$0.4\ \pi$mm mrad, beam energy 125 MeV, charge 10 pC, and beam size 1 μm. By X-ray spectroscopy measurement, an ultralow $\in_n=0.1\ \pi$mm mrad was demonstrated with beam energy 450 MeV, and bunch radius 0.1 μm. Since the beam size 1 μm or even 0.1 μm is much smaller than the $CO_2$ laser wavelength and laser transverse dimension, the beam mainly sees a uniform field; besides, the beam size could be much smaller than the channel width 13 μm.

C) Modeling

Figure 6A:
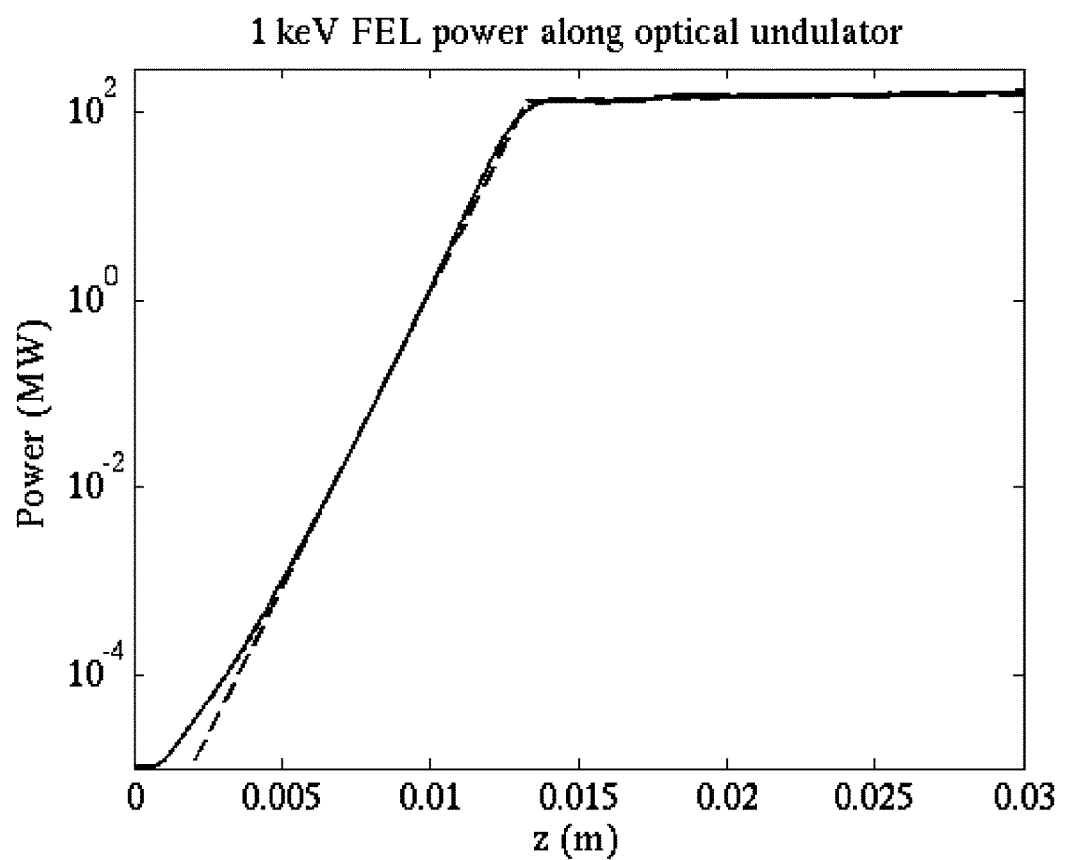
FIGS. 6A-B show calculated free electron laser output power for several cases.

We model the above described process of method one as an effective optical undulator. The electron bunch has centroid energy 60 MeV, $\sigma_y=0.06$, normalized emittance of $\in_{n,x(y)}=0.2\ \pi$mm mrad in both the x and y planes, and peak current $I_{pk}=3$ kA. There is no focusing channel. The initial bunch transverse size is $\sigma_{x(y)}=10$ μm. For this setup, the optical undulator period is $\lambda_u=10$ μm, assuming a $CO_2$ laser, and the effective undulator rms parameter K=1.5. With this set of parameters, the FEL Pierce parameter is about $\rho=3.0\times 10^{-4}$; hence, the saturation power at the end of exponential growth is about 140 MW. We double check this analytical calculation against a GENESIS simulation. The GENESIS code has been demonstrated to be correct in an optical undulator, since the analytical theory and the code built for optical undulator were consistent with the GENESIS simulation. The simulated FEL power is shown as the solid curve in FIG. 6A; the analytical power with gain length $L_G=0.7$ mm is the dashed curve on FIG. 6A. With a total charge of 50 pC, there are about $1.4\times 10^{10}$ photons/pulse. By using MHz repetition-rate lasers, this source has the capacity of generating high-repetitive X-ray photons of $10^{16}$-$10^{17}$/s.

Figure 6B:
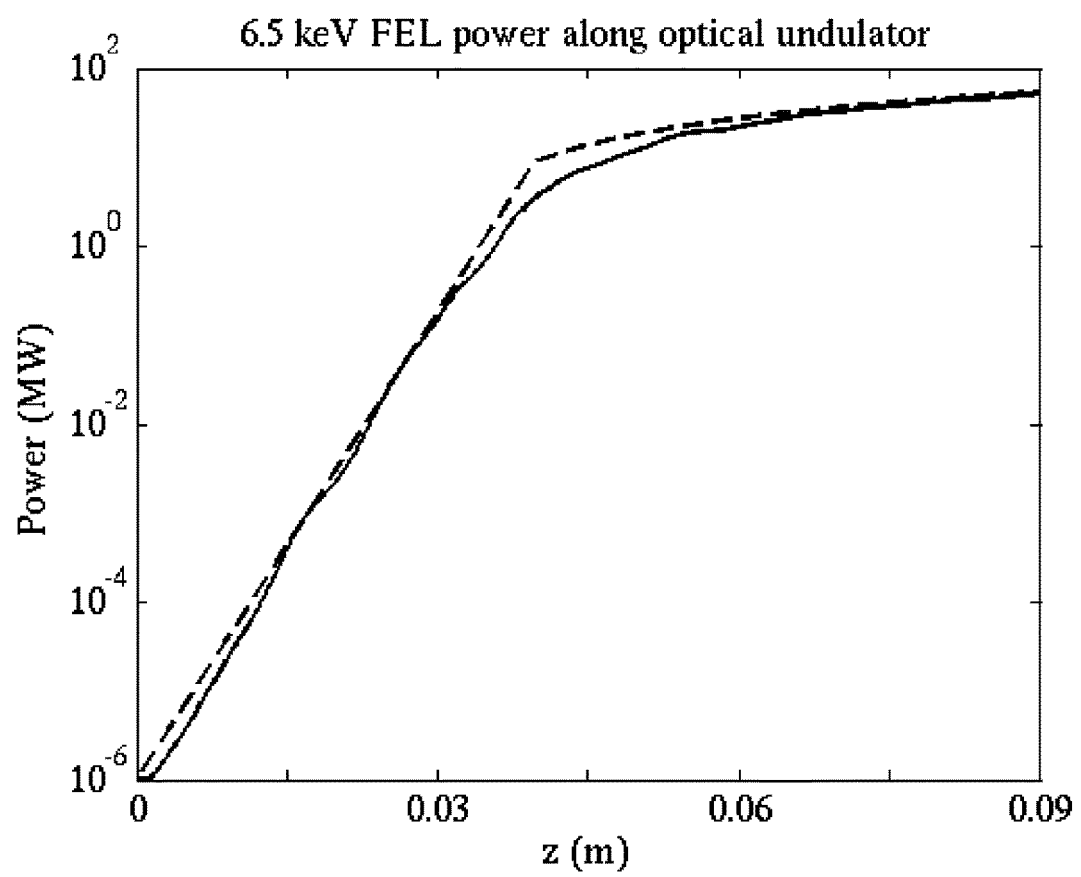

To compare with a hard X-ray source of 6.5 keV as reported in the literature, the centroid energy of electron bunch is 117 MeV, with the same other parameters and conditions as those for the above 1 keV FEL case. The FEL Pierce parameter for this case is about $\rho=2.0\times10^4$; hence, the saturation power is about 50 MW. Similarly, the GENESIS simulated FEL power and analytical power with $L_G=2.5$ mm are shown as the solid and dashed curves in FIG. 6B, where a linear power growth is seen after the exponential growth ceases. With a total charge of 60 pC, there are about $1.0\times10^9$ photons with a 10 to 20 fs duration, in contrast to $2\times10^7$ photons in a 3.5 ps pulse reported in the literature.

Besides, if the quality of laser and beam does not support a high-gain FEL, for the spontaneous undulator radiation, the total photon flux in the forward cone is proportional to the square of the undulator periods, i.e., $N^2$, and the total flux in the opening angle is proportional to N. Thus, the proposed lateral tilted lasers could significantly improve the total X-ray flux by extending the number of undulator periods by several orders.

D) Conclusions

To restate, by invoking two pulse front tilted lateral lasers, high-gain exponential growth makes possible generation of a FEL-type X-ray source via Thompson scattering. The critical improvement is lengthening the electron-laser synchronic interaction time by several orders; cylinder lenses or periodic microstructures are adopted to enhance the central electric field, realizing the high photon number $10^9$ to $10^{10}$ with femtoseconds duration, and the brightness enhanced by 4 to 5 orders.

The invention claimed is:

1. Apparatus for producing X-rays, the apparatus comprising:
    at least one source of optical radiation configured to emit pulses of optical radiation;
    focusing optics configured to bring two counter-propagating pulses of the optical radiation to a common line focus;
    an electron source configured to provide an electron beam aligned with the line focus;
    wherein the focusing optics include one or more dispersive optical elements configured to introduce a tilt angle between phase fronts of the counter-propagating pulses and pulse fronts of the counter-propagating pulses;
    wherein the tilt angle is selected to substantially match a velocity of pulse front propagation along the line focus with an electron velocity of the electron beam along the line focus; and
    wherein a standing wave pattern formed by the counter-propagating pulses at the line focus acts as an undulator for emission of X-rays by electrons in the electron beam.

2. The apparatus of claim 1, further comprising an X-ray resonator configured to provide feedback for the emitted X-rays, whereby a free electron laser is provided.

3. The apparatus of claim 1, wherein the dispersive optical elements comprise diffraction gratings having uniform line spacing.

4. The apparatus of claim 1, wherein the focusing optics comprise cylindrical mirrors.

5. The apparatus of claim 1, wherein the focusing optics comprise cylindrical lenses.

6. The apparatus of claim 1, wherein the focusing optics comprise a periodic microstructure configured to provide optical resonance of the counter-propagating pulses at the line focus.

7. The apparatus of claim 1, wherein the electron beam is configured as separated bunches of electrons.

8. The apparatus of claim 1, wherein the counter-propagating pulses are obtained by splitting an input pulse with an optical splitter, whereby relative jitter between the counter-propagating pulses is reduced.

9. The apparatus of claim 1, wherein a root mean square time variation of an electric field of the counter-propagating pulses is less than about 0.5%.

* * * * *